(12) United States Patent
Peterson

(10) Patent No.: US 6,813,865 B2
(45) Date of Patent: Nov. 9, 2004

(54) FASTENER ASSEMBLY FOR USE WITH A TRIM PANEL

(75) Inventor: Robert G. Peterson, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 82 days.

(21) Appl. No.: 10/171,209

(22) Filed: Jun. 12, 2002

(65) Prior Publication Data

US 2003/0230044 A1 Dec. 18, 2003

(51) Int. Cl.[7] .............................. E04B 5/00; E04B 9/00
(52) U.S. Cl. ................... 52/506.05; 52/716.5; 296/39.1
(58) Field of Search ........................... 52/506.05, 716.5; 296/39.1, 214; 24/682; 411/503

(56) References Cited

U.S. PATENT DOCUMENTS

| | | | | |
|---|---|---|---|---|
| 4,270,328 A | * | 6/1981 | Page et al. ..................... 52/511 |
| 5,056,199 A | * | 10/1991 | Stein et al. ................. 24/682.1 |
| 5,586,853 A | * | 12/1996 | Poe ............................. 411/373 |
| 6,276,109 B1 | * | 8/2001 | Hingorani et al. ......... 52/716.5 |
| 6,419,307 B1 | | 7/2002 | Maruyama et al. |
| D462,257 S | | 9/2002 | Alexander |
| 6,474,921 B1 | * | 11/2002 | Gordon ...................... 411/508 |
| 6,517,147 B2 | * | 2/2003 | Grimm ...................... 296/210 |
| 2001/0003400 A1 | * | 6/2001 | Grimm et al. |
| 2002/0043041 A1 | * | 4/2002 | Yoyasu |

OTHER PUBLICATIONS

Pictures of fastener assembly, 3 pages.

* cited by examiner

*Primary Examiner*—Carl D. Friedman
*Assistant Examiner*—Nahid Amiri
(74) *Attorney, Agent, or Firm*—Bill C. Panagos

(57) ABSTRACT

A fastener assembly for attaching a trim panel to a vehicle mounting member includes a retainer that is attachable to a concealable surface of the trim panel. The assembly also includes a fastening element that is movably attachable to the retainer by moving the fastening element laterally with respect to the retainer. The fastening element is further adapted to be attached to the mounting member.

26 Claims, 1 Drawing Sheet

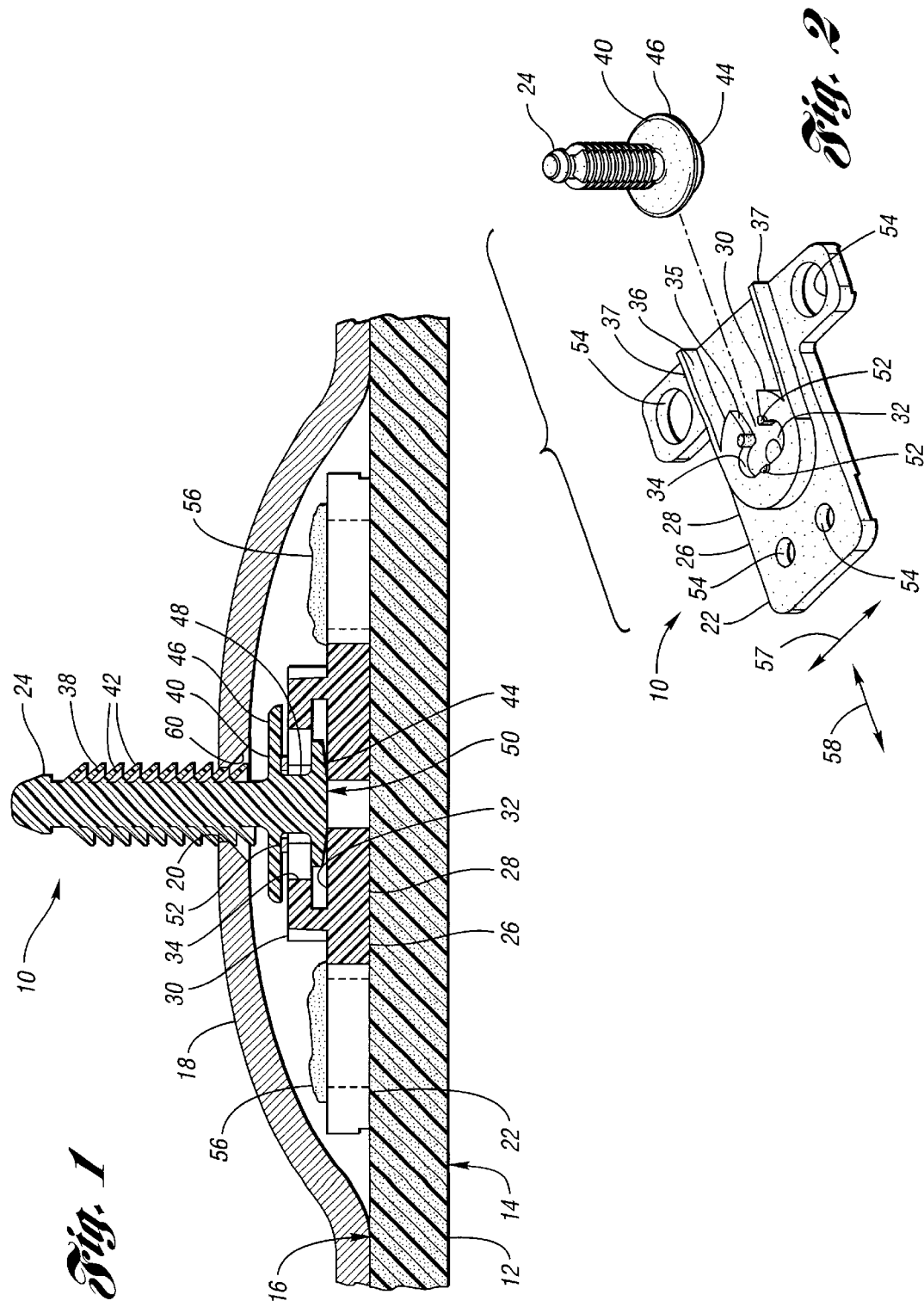

FASTENER ASSEMBLY FOR USE WITH A TRIM PANEL

BACKGROUND OF THE INVENTION

1. Field of the Invention

The invention relates to a fastener assembly for attaching a trim panel to a vehicle.

2. Background Art

Trim panels may be used to provide finished appearance surfaces in motor vehicles. Such trim panels include, for example, headliners and door panels. Prior fasteners for attaching trim panels to a vehicle include push pin fasteners. One known push pin fastener for attaching a headliner to a vehicle roof includes a pin body that extends through the headliner and has multiple fins or ridges that engage the roof. The push pin fastener further includes an exposed head that engages the appearance surface of the headliner. Thus, the head is visible after installation of the headliner in the vehicle.

Another known push pin fastener for attaching a door panel to a vehicle door includes a pin body that is configured to extend into an opening formed on the door, and a head attached to the pin body. The head is configured to extend into a hole formed on a back surface of the door panel, such that the push pin fastener is movable with respect to the door panel prior to attachment of the door panel to the door. This push pin fastener, however, is not sufficiently retained by the door panel and is difficult to properly align with the opening in the door.

SUMMARY OF THE INVENTION

Under the invention, a fastener assembly is provided for attaching a trim panel to a vehicle mounting member, wherein the trim panel includes a concealable surface that faces the mounting surface when the trim panel is attached to the mounting surface. The fastener assembly includes a retainer that is attachable to the concealable surface of the trim panel, and a fastening element that is movably attachable to the retainer by moving the fastening element laterally with respect to the retainer. The fastening element is further adapted to be attached to the mounting member.

With such a configuration, the fastener assembly may be concealed from view when the trim panel is attached to the mounting member. Furthermore, the retainer sufficiently retains the fastening element during installation of the trim panel.

BRIEF DESCRIPTION OF THE DRAWINGS

FIG. 1 is a cross-sectional view of a fastener assembly, according to the invention, attached to a trim panel; and FIG. 2 is an exploded perspective view of the fastener assembly.

DETAILED DESCRIPTION OF THE PREFERRED EMBODIMENTS

FIG. 1 shows a fastener assembly 10 according to the invention for use with a trim panel 12, such as a headliner or door panel, having an exposed surface or appearance surface 14 and a concealable surface 16. The fastener assembly 10 is configured to attach the trim panel 12 to a vehicle mounting member 18, such as a roof or door sheet metal, having an opening 20, such as a slot or other aperture. When the trim panel 12 is attached to the mounting member 18, the appearance surface 14 faces away from the mounting member 18, and the concealable surface 16 faces toward the mounting member 18.

Referring to FIGS. 1 and 2, the fastener assembly 10 includes a first fastener portion, such as a retainer 22, attached to the concealable surface 16 of the trim panel 12, and a second fastener portion, such as fastening element 24, that is movably attachable to the retainer 22 by moving the fastening element 24 laterally with respect to the retainer 22. The retainer 22 includes a retainer body 26 having first and second body portions 28 and 30, respectively, that define a cavity 32. The second body portion 30 has an elongated aperture 34 extending from the cavity 32, and a tapered aperture 35 extending from the elongated aperture 34 and the cavity 32.

The retainer 22 further includes a guide channel 36 for receiving the fastening element 24, as explained below in greater detail. In the embodiment shown in the FIG. 2, the guide channel 36 is defined by side walls 37 that extend toward the cavity 32.

The fastening element 24 may have any suitable configuration, such as a push pin. In the embodiment shown in FIGS. 1 and 2, the fastening element 24 includes an elongated body 38 and a head 40 extending from the body 38. The body 38 is configured to extend into the opening 20 of the mounting member 18, and includes a plurality of ridges or fins 42 that are engageable with the mounting member 18 so as to attach the fastening assembly 10 and the trim panel 12 to the mounting member 18.

The head 40 has first and second flange portions 44 and 46, respectively, and a middle portion 48 disposed between the flange portions 44 and 46. The middle portion 48 is configured to snap fit laterally through the tapered aperture 35 and into the elongated aperture 34 so as to movably attach the fastening element 24 to the retainer 22, such that the fastening element 24 is laterally movable with respect to the retainer 22. More specifically, the middle portion 48 may have a diameter that is slightly larger than the narrowest lateral dimension of the tapered aperture 35, such that the tapered aperture 35 expands slightly when the middle portion 48 is snap fit through the tapered aperture 35. As shown in FIG. 1, the first flange portion 44 is disposed in the cavity 32, and the second body portion 30 extends between the flange portions 44 and 46 when the fastening element 24 is attached to the retainer 22.

In the embodiment shown in FIG. 1, the first flange portion 44 has a contoured surface, such as convex surface 50, that engages the first body portion 28 when the fastening element 24 is attached to the retainer 22. Such a configuration helps to maintain the fastening element 24 in a proper orientation with respect to the retainer 22 until a sufficient force is applied to the fastening element 24 so as to move the fastening element 24 laterally with respect to the retainer 22. Alternatively or supplementally, the fastener assembly 10 may have any suitable configuration to help maintain the fastening element 24 in a desired orientation with respect to the retainer 22, if required for a particular application. For example, the second body portion 30 may be provided with one or more projections 52 that engage the second flange portion 46 when the fastening element 24 is attached to the retainer 22. As another example, one or both of the flange portions 44 and 46 may have one or more projections (not shown) that engage the second body portion 30.

While the fastener assembly 10 may comprise any suitable material and be manufactured in any suitable manner, the retainer 22 and the fastening element 24 are each preferably made of molded plastic, such as polypropylene. Other suitable materials include nylon and acetal.

Referring to FIGS. 1 and 2, mounting of the trim panel 12 on the mounting member 18 will now be described. First, the retainer 22 is fixedly attached to the concealable surface 16 of the trim panel 12. The retainer 22 may be attached to the trim panel 12 in any suitable manner, such as with an adhesive, ultrasonic welding and/or separate fasteners. For example, the first body portion 28 may be provided with one or more openings 54 for receiving a suitable adhesive 56. With such a configuration, the adhesive 56 may be used to form an adhesive bond, as well as a mechanical bond, between the trim panel 12 and the retainer 22. Alternatively or supplementally, the first body portion 28 may be provided with features to allow for ultrasonic welding attachment to the trim panel 12.

Furthermore, an assembly fixture (not shown), or other suitable positioning device, may be used to position the retainer 22 on the trim panel 12 so as to achieve a desired orientation of the retainer 22 with respect to the mounting member 18. For example, the retainer 22 may be positioned on the trim panel 12 such that the elongated aperture 34 is generally aligned with the opening 20 of the mounting member 18 when the trim panel 12 is positioned proximate the mounting member 18.

Next, the first flange portion 44 of the fastening element 24 may be positioned in guide channel 36 of the retainer 22, and then moved laterally toward the cavity 32 such that the middle portion 48 snaps through the tapered aperture 35 and into the elongated aperture 34. When the middle portion 48 is disposed in the elongated aperture 34, the fastening element 24 is laterally movable with respect to the retainer 22, while being sufficiently retained by the retainer 22. While the retainer 22 may be configured to allow any sufficient amount of movement of the fastening element 24, in one embodiment of the invention, the elongated aperture 34 is configured to allow 12 millimeters (mm) of travel in a first direction 57, and 6 mm of travel in a second direction 58 substantially perpendicular to the first direction 57. Generally, the retainer 22 may be configured to allow lateral movement of the middle portion 48 in a plane defined by the elongated aperture 34, wherein the plane is generally perpendicular to the elongated body 38.

After the fastener assembly 10 has been attached to the trim panel 12, the trim panel 12 may be positioned on the mounting member 18. Because the retainer 22 may be accurately positioned on the trim panel 12, using an assembly fixture or other positioning device as mentioned above, the fastening element 24 will preferably be generally aligned with the opening 20 of the mounting member 18 when the trim panel 12 is positioned on the mounting member 18. As the trim panel 12 is moved toward the mounting member 18, the fastening element 24 is configured to extend into the opening 20 such that the fins 42 engage the mounting member 18, thereby attaching the fastening element 24 to the mounting member 18. If the fastening element 24 is not sufficiently aligned with the opening 20 so as to extend into the opening 20, the fastening element 24 will engage the mounting member 18 and will be urged to move laterally with respect to the retainer 22 so as to become properly aligned with the opening 20. For example, the mounting member 18 may be provided with slanted surface portions 60 that slant toward the opening 20. Thus, the fastener assembly 10 may be configured to permit blind installation of the trim panel 12. Furthermore, any suitable number of fastener assemblies 10 may be attached to the trim panel 12 so as to provide sufficient attachment points between the trim panel 12 and the mounting member 18.

Generally, the fastening element 24 may be attached to the retainer 22 by moving the fastening element 24 in a first direction, such as a lateral direction with respect to the retainer 22. The fastening element 24 may then be attached to the mounting member 18 by moving the fastening element 24 in a second direction that is different than the first direction. For example, the second direction may be generally perpendicular to the first direction.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A trim panel and fastener assembly combination for mounting on a vehicle mounting member, the combination comprising:
   a trim panel having a concealable surface adapted to face the mounting member when the trim panel is mounted on the mounting member; and
   a fastener assembly including a retainer in fixed relation to the concealable surface of the trim panel, and a fastening element that is movably attachable to the retainer by moving the fastening element laterally with respect to the retainer, the fastening element further being adapted to be attached to the mounting member so as to mount the trim panel on the mounting member;
   wherein the retainer has a cavity and the fastening element includes a head having a flange portion that is movably disposed in the cavity when the fastening element is attached to the retainer, and wherein the retainer further has a guide channel extending laterally from the cavity for guiding the flange portion into the cavity.

2. The combination of claim 1 wherein the fastening element is configured to snap-fit into the retainer such that the fastening element is movably retained by the retainer.

3. The combination of claim 1 wherein the retainer is configured to allow the fastening element to move in first and second directions with respect to the retainer when the fastening element is attached to the retainer.

4. The combination of claim 1 wherein the flange portion has a contoured surface that is engageable with the retainer when the fastening element is attached to the retainer.

5. The combination of claim 1 wherein the retainer has first and second body portions that define the cavity, and the head of the fastening element includes an additional flange portion, wherein when the fastening element is attached to the retainer, the flange portion is disposed in the cavity and the second body portion extends between the flange portions.

6. The combination of claim 5 wherein the retainer further includes at least one projection extending from the second body portion, the at least one projection being engageable with the additional flange portion of the fastening element when the fastening element is attached to the retainer.

7. The combination of claim 5 wherein the retainer has an opening extending therethrough, and the retainer is attached to the trim panel with adhesive that extends through the opening of the retainer such that the adhesive forms an adhesive and mechanical bond between the trim panel and the retainer.

8. The combination of claim 5 wherein the head of the fastening element includes a middle portion disposed between the flange portions, and the second body portion has an aperture extending from the cavity for receiving the middle portion of the fastening element when the fastening element is attached to the retainer.

9. The combination of claim 8 wherein the second body portion has an additional aperture extending from the aperture and the cavity, and the middle portion of the fastening element is configured to snap-fit through the additional aperture so as to be movably received in the aperture.

10. The combination of claim 9 wherein the additional aperture tapers toward the aperture.

11. A headliner and fastener assembly combination for use with a vehicle including a roof having an opening, the combination comprising:
   a headliner having a concealable surface adapted to face the roof when the combination is attached to the vehicle; and
   a fastener assembly including a retainer attached to the concealable surface of the headliner, and a fastening element that is movably attachable to the retainer by moving the fastening element laterally with respect to the retainer, the retainer including a retainer body having first and second body portions that define a cavity, the second body portion further having an elongated aperture extending from the cavity, and a tapered aperture extending from the elongated aperture, the fastening element including an elongated body adapted to extend into the opening of the roof and a head extending from the body, the head having first and second flange portions and a middle portion disposed between the flange portions, the middle portion being configured to snap-fit through the tapered aperture and into the elongated aperture so as to movably attach the fastening element to the retainer such that the fastening element is laterally movable with respect to the retainer, wherein the first flange portion is disposed in the cavity and the second body portion extends between the flange portions when the fastening element is attached to the retainer.

12. The combination of claim 4 wherein the first flange portion has a convex surface that is engageable with the retainer when the fastening element is attached to the retainer.

13. A fastener assembly for attaching a trim panel to vehicle mounting member, wherein the trim panel includes a concealable surface that faces the mounting member when the trim panel is attached to the mounting member, the fastener assembly comprising:
   a retainer that is attachable to the concealable surface of the trim panel, the retainer having first and second body portions that define a cavity, the second body portion having an aperture extending from the cavity and an additional aperture extending from the aperture and the cavity; and
   a fastening element that is movably attachable to the retainer by moving the fastening element laterally with respect to the retainer, the fastening element including a head having first and second flange portions and a middle portion disposed between the flange portions, the middle portion being configured to snap-fit through the additional aperture so as to be movably received in the aperture, the fastening element further being adapted to be attached to the mounting members;
   wherein when the fastening element is attached to the retainer, the first flange portion is disposed in the cavity, the middle portion is received in the aperture, and the second body portion extends between the flange portions.

14. The assembly of claim 13 wherein the retainer is configured to allow the fastening element to move in first and second directions with respect to the retainer when the fastening element is attached to the retainer, wherein the first and second directions are generally coplanar.

15. The assembly of claim 13 wherein the first flange portion has a convex surface that is engageable with the retainer when the fastening element is attached to the retainer.

16. The assembly of claim 13 wherein the retainer has a guide channel extending laterally from the cavity for guiding the first flange portion into the cavity.

17. The assembly of claim 13 wherein the fastening element includes an elongated body that is adapted to extend into an opening formed in the mounting member.

18. The assembly of claim 13 wherein the retainer further includes at least one projection extending from the second body portion, the at least one projection being engageable with the second flange portion of the fastening element when the fastening element is attached to the retainer.

19. The assembly of claim 13 wherein the additional aperture tapers toward the aperture.

20. A fastener assembly for attaching a trim panel to vehicle mounting member, wherein the trim panel includes a concealable surface that faces the mounting member when the trim panel is attached to the mounting member, the fastener assembly comprising:
   a retainer that is attachable to the concealable surface of the trim panel; and
   a fastening element that is movably attachable to the retainer by moving the fastening element in a first direction, the fastening element further being adapted to be attached to the mounting member by moving the fastening element in a second direction generally perpendicular to the first directions;
      wherein the retainer is configured to allow the fastening element to move laterally with respect to the retainer in two substantially perpendicular directions when the fastening element is attached to the retainer, the two substantially perpendicular directions lying in a plane that is generally perpendicular to the second direction.

21. The fastener assembly of claim 20 wherein the retainer includes a cavity and an aperture extending from the cavity, and the fastening element includes first and second flange portions and a middle portion disposed between the flange portions, wherein the cavity is configured to receive the first flange portion and the aperture is configured to receive the middle portion when the fastening element is attached to the retainer, and wherein the aperture is configured to allow the middle portion to move laterally with respect to the retainer in the two substantially perpendicular directions when the fastening element is attached to the retainer.

22. A trim panel and fastener assembly combination for mounting on a vehicle mounting member, the combination comprising:
   a trim panel having a concealable surface adapted to face the mounting member when the trim panel is mounted on the mounting member; and
   a fastener assembly including a retainer in fixed relation to the concealable surface of the trim panel, and a fastening element that is movably attachable to the retainer by moving the fastening element laterally with respect to the retainer, the fastening element further being adapted to be attached to the mounting member so as to mount the trim panel on the mounting member;

wherein the retainer has an opening extending therethrough, and the retainer is attached to the trim panel with adhesive that extends through the opening of the retainer such that the adhesive forms an adhesive and mechanical bond between the trim panel and the retainer.

23. The combination of claim 22 wherein the retainer has first and second body portions that define a cavity, and the fastening element includes a head having first and second flange portions, wherein when the fastening element is attached to the retainer, the first flange portion is disposed in the cavity and the second body portion extends between the flange portions.

24. The combination of claim 22 wherein the retainer is configured to allow the fastening element to move laterally with respect to the retainer in first and second directions when the fastening element is attached to the retainer, and wherein the first and second directions are substantially perpendicular to each other.

25. A fastener assembly for attaching a trim panel to vehicle mounting member, wherein the trim panel includes a concealable surface that faces the mounting member when the trim panel is attached to the mounting member, the fastener assembly comprising:
 a retainer that is attachable to the concealable surface of the trim panel; and
 a fastening element that is movably attachable to the retainer by moving the fastening element laterally with respect to the retainer, the fastening element further being adapted to be attached to the mounting member;
  wherein the retainer is configured to allow the fastening element to move laterally with respect to the retainer in first and second directions when the fastening element is attached to the retainer, the first and second directions being substantially perpendicular to each other.

26. The assembly of claim 25 wherein the retainer includes an aperture for receiving a portion of the fastening element, and an additional aperture that extends from the aperture, and wherein the portion of the fastening element is configured to snap-fit through the additional aperture so as to be movably received in the aperture.

* * * * *